(12) United States Patent
Chen et al.

(10) Patent No.: US 7,365,743 B1
(45) Date of Patent: Apr. 29, 2008

(54) ASSIGNMENTS FOR PARALLEL RASTERIZATION

(75) Inventors: Paul Chen, Cupertino, CA (US); James G. Sandman, Jr., Los Altos Hills, CA (US)

(73) Assignee: Adobe Systems Incorporated, San Jose, CA (US)

( * ) Notice: Subject to any disclaimer, the term of this patent is extended or adjusted under 35 U.S.C. 154(b) by 913 days.

(21) Appl. No.: 10/267,419

(22) Filed: Oct. 8, 2002

(51) Int. Cl.
*G06T 15/50* (2006.01)

(52) U.S. Cl. .................. 345/422; 345/418; 345/539; 345/545; 358/1.13

(58) Field of Classification Search ........... 345/505, 345/418, 422, 539, 545; 718/102, 107; 358/1.13
See application file for complete search history.

(56) References Cited

U.S. PATENT DOCUMENTS

| | | | | |
|---|---|---|---|---|
| 4,873,515 | A * | 10/1989 | Dickson et al. | 345/614 |
| 5,157,765 | A * | 10/1992 | Birk et al. | 345/506 |
| 5,574,847 | A * | 11/1996 | Eckart et al. | 345/505 |
| 5,600,768 | A * | 2/1997 | Andresen | 345/629 |
| 5,692,210 | A * | 11/1997 | Mita et al. | 345/502 |
| 6,108,460 | A * | 8/2000 | Rich | 382/304 |
| 6,414,680 | B1 * | 7/2002 | Klosowski et al. | 345/423 |
| 6,717,097 | B1 * | 4/2004 | Sandstrom et al. | 219/121.6 |
| 7,270,388 | B2 * | 9/2007 | Mitsuzawa et al. | 347/9 |
| 2001/0051971 | A1 * | 12/2001 | Kato | 709/102 |
| 2002/0015039 | A1 * | 2/2002 | Moore | 345/421 |
| 2004/0008200 | A1 * | 1/2004 | Naegle et al. | 345/505 |
| 2004/0042047 | A1 * | 3/2004 | Kawatoko et al. | 358/3.06 |
| 2004/0159636 | A1 * | 8/2004 | Sandstrom et al. | 219/121.6 |
| 2004/0207685 | A1 * | 10/2004 | Otsuki | 347/40 |
| 2007/0103745 | A1 * | 5/2007 | Ogata et al. | 358/521 |

OTHER PUBLICATIONS

Foley, James D., et al., "Computer Graphics, Principles and Practice," Second Edition in C, Addison-Wesley Publishing Company, ISBN 0-201-84840-6, Copyright © 1996, 1990.

* cited by examiner

*Primary Examiner*—Kee M. Tung
*Assistant Examiner*—Javid A Amini
(74) *Attorney, Agent, or Firm*—Fish & Richardson P.C.

(57) ABSTRACT

Methods and apparatus, including computer program products, to rasterize an image by generating assignments and allocating the assignments among multiple processor threads such that no two processor threads are rasterizing concurrently into overlapping regions of a pixel array. Multiple assignments are generated. Each assignment specifies one or more graphics objects and a region of the pixel array into which the specified graphics objects are to be rasterized. Multiple processes are established for rasterizing objects into a pixel array. Each process is operable to receive an assignment and to rasterize the objects of the assignment into the region of the assignment. Assignments are selected for concurrent execution by processes so that no two selected assignments have overlapping regions. The selected assignments are concurrently executed by separate processes to rasterize the respective objects of the assignments into their respective regions.

52 Claims, 5 Drawing Sheets

ASSIGNMENTS FOR PARALLEL RASTERIZATION

BACKGROUND OF THE INVENTION

The present invention relates to rasterizing images into pixel arrays.

An image includes graphics objects, also called primitives, that describe visual elements of the image. When the image is rasterized into a pixel array corresponding to a page or a screen, the graphics objects are rendered into pixels from the pixel array such that pixel values, typically representing colors, are specified for the pixels.

For rasterization, a large image is typically divided into multiple disjoint bands whose size depends on memory and system restrictions. During rasterization, each band of the image can be assigned to a processor thread. The processor thread is a coherent sequence of processing steps that can be performed by a single processor. To rasterize the assigned band, a processor thread may access additional resources, such as display lists or font data.

The image can be rasterized sequentially or in parallel. In a system having a single processor, typically a single processor thread rasterizes all bands of the image sequentially, i.e., one band after the other. In a system having multiple processors, typically bands of the image are rasterized in parallel, i.e., by concurrently running processor threads that rasterize disjoint bands.

Alternatively, the pixel array can be divided into disjoint regions, such as tiles, and different regions can be assigned to different processor threads that rasterize only the portion of the image that lies inside the assigned region. If the image covers multiple document pages, different pages can be assigned to different processor threads.

In an alternative technique, graphics objects of the image are arbitrarily assigned to processor threads for parallel rasterization. Each processor thread rasterizes its assigned graphics objects into a buffer array corresponding to the entire pixel array, and, in a final processing step, the rasterized graphics objects in the buffer arrays are composed into a single rasterized image.

SUMMARY OF THE INVENTION

An image is rasterized by generating assignments and allocating the assignments among multiple processor threads such that no two processor threads are rasterizing concurrently into overlapping regions of a pixel array. In general, in one aspect, the invention provides methods, systems and apparatus, including computer program products, that implement techniques for rasterizing an image into a pixel array. The techniques include generating multiple assignments; establishing multiple processes for rasterizing objects into a pixel array; selecting assignments for concurrent execution by processes; and concurrently executing the selected assignments by separate processes to rasterize the respective objects of the assignments into their respective regions. Each assignment specifies one or more graphics objects and a region of the pixel array into which the specified graphics objects are to be rasterized. Each process is operable to receive an assignment and to rasterize the objects of the assignment into the region of the assignment. The assignments are selected for concurrent execution so that no two selected assignments have overlapping regions.

Particular implementations can include one or more of the following features. The multiple assignments can include two or more assignments that specify overlapping regions of the pixel array. The multiple assignments can include a first assignment specifying a first region of the pixel array and a second assignment specifying a second region of the pixel array. The first region of the pixel array can include one or more pixels included in the second pixel array. The first assignment and the second assignment can specify a common region of the pixel array.

Selecting assignments can include selecting a first assignment and a second assignment for concurrent execution by a first process and a second process, respectively. After the first process has completed execution of the first assignment, a third assignment of the plurality of assignments can be selected for execution by the first process. The third assignment and the first assignment can specify a common region of the pixel array. Before selection of the third assignment for execution by the first process, the third assignment can be selected for execution by either of the first process or the second process. After the selection of the first assignment for execution, the third assignment cannot be selected for execution until the first process has completed execution of the first assignment. The third assignment and the second assignment can specify a common region of the pixel array, and the third assignment can be selected by the first process only after the second process has completed rasterization according to the second assignment.

Generating multiple assignments can include generating an assignment queue. The assignments can be ordered in the assignment queue based at least in part on the determination whether concurrent execution of the assignments would require rasterization into overlapping regions. After selecting an assignment for execution by a process, assignment information can be recorded. The recorded information can identify the region specified in the selected assignment as being unavailable for assignment to other processes while the selected assignment is being executed.

Generating multiple assignments can include receiving multiple graphics objects associated with an image to be rasterized into a pixel array; dividing the pixel array into multiple regions; and associating, as an assignment of the multiple assignments, one or more of the multiple graphics objects with one or more of the multiple regions into which the associated graphics objects are to be rasterized.

Associating one or more of the multiple objects with one or more of the multiple regions can include associating the graphics objects with the regions to form assignments based at least in part on a comparison of an amount of work required to execute each of multiple assignments. Receiving multiple graphics objects can include receiving a first group of graphics objects associated with the image. Dividing the pixel array into multiple regions can include dividing the pixel array into a first plurality of disjoint regions. Associating the graphics objects with the regions can include associating one or more graphics objects in the first group of graphics objects with one or more regions from the first plurality of disjoint regions to form assignments in a first collection of assignments.

Receiving multiple graphics objects can include receiving a second group of graphics objects associated with the image. Dividing the pixel array into multiple regions can include dividing the pixel array into a second plurality of disjoint regions. Associating the graphics objects with the regions can include associating one or more graphics objects in the second group of graphics objects with one or more regions from the second plurality of disjoint regions to form assignments in a second collection of assignments.

The invention can be implemented to realize one or more of the following advantages. Multiple processor threads can be organized to minimize resource requirements during rasterization of an image. For example, idle times can be minimized for the processors that perform the multiple processor threads. The multiple processor threads can share resources, such as data buffers, display lists, or coloring instructions, to minimize memory requirements. During rasterization, assignments can be generated to optimally balance workload among the multiple processor threads. The workload can be balanced such that all processor threads complete assignments at substantially the same time to minimize waiting time for subsequent processing. The assignments can be organized such that the multiple processor threads require minimal synchronization.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
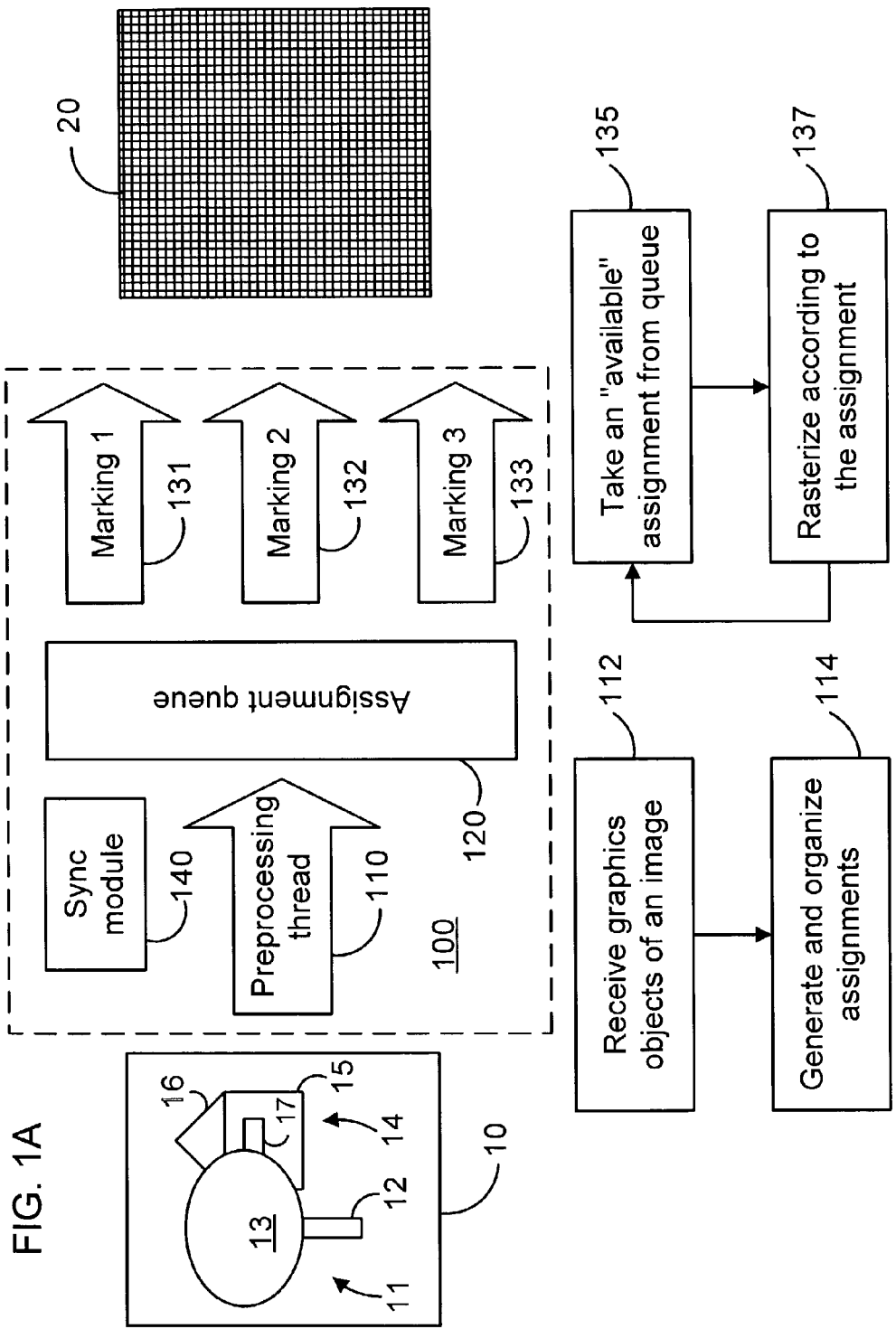
FIG. 1A is a schematic diagram showing a system to rasterize an image according to one aspect of the invention.
FIG. 1B is a flowchart showing a process performed by a preprocessing thread according to one aspect of the invention.
FIG. 1C is a flowchart showing a process performed by a marking thread according to one aspect of the invention.

As shown in FIG. 1A, a system 100 can rasterize an image 10 into a pixel array 20 in accordance with one aspect of the invention. As an example, the image 10 includes multiple graphics objects: a "tree" 11 and a "house" 14. A graphics object describes an area, an object, or a portion of an object in the image, and can include information such as geometrical layout, shape, orientation, color, painting method, composition, and opacity. A graphics object can be divided into graphics elements. For example, the tree 11 can be divided into a "tree trunk" 12 and a "foliage" 13, and the house 14 can be divided into a "wall section" 15, a "roof" 16, and a "window" 17. The graphics elements can be complex graphics objects or graphics primitives. Graphics primitives are fundamental graphics objects that can be used to represent an image, and can include fundamental geometrical objects, i.e., points, lines, polygons, and circles, or text and corresponding character information.

The pixel array 20 has multiple pixels periodically arranged within a rectangular region representing a document page or a monitor screen. In alternative implementations, the pixel array can have pixels arranged in a non-periodic fashion, or within a non-rectangular region, or both.

To rasterize the image 10, pixel values are specified for pixels of the pixel array 20. Typically, the pixel value represents a color of the pixel. Optionally, the pixel value can represent other information, for example, opacity of the pixel in the image.

The system 100 includes a preprocessing thread 110, an assignment queue 120, multiple marking threads 131-133, and a synchronization module 140. The preprocessing thread 110 and marking threads 131-133 are processor threads. A processor thread is a coherent sequence of processing steps that can be performed by a single processor, e.g., a central processing unit ("CPU"). Optionally, one processor thread can be performed by more than one CPU, or one CPU can perform more than one processor thread. In alternative implementations, there can be more than one preprocessing thread. The number of marking threads can vary from implementation to implementation. As discussed with reference to FIG. 5, an optimal number of marking threads can depend on the number of available CPUs and on the structure and size of the image 10.

As shown in FIG. 1B, at the start of the rasterization process, the preprocessing thread 110 receives graphics objects of the image (step 112). The graphics objects can be received, for example, from a digital art application, a storing unit, or the Internet. The graphics objects can be received in a pre-organized form. For example, the graphics objects can be received in groups divided among multiple bands that describe a page. Alternatively, a single band can describe one page.

From the received graphics objects, the preprocessing thread generates assignments for the marking threads and organizes the generated assignments into a sequence in the assignment queue 120 (step 114). In one implementation, the received graphics objects are in multiple bands and assignments are generated from only one of the multiple bands at a time. Assignments from a next band can be generated during or after completion of the rasterization of a previous band.

Each assignment in the assignment queue specifies one or more graphics objects and a region of the pixel array 20. A marking thread that receives a given assignment rasterizes the object or objects specified in the assignment into the specified region of the pixel array. The specified region can include a set of contiguous pixels, or two or more disjoint sets of pixels that can be contiguous or not contiguous in the pixel array. The marking thread receiving the assignment rasterizes only those portions of the specified object or objects that are associated with (e.g., that lie within) the specified region. Any object portions not associated with the region specified in a given assignment (e.g., that lie outside of the specified region) will thus be rasterized by a marking thread that receives an assignment specifying the object(s) and a different region of the pixel array. Exemplary assignments are discussed below with reference to FIG. 2, and generating and organizing the assignments are discussed in detail with reference to FIGS. 3A and 4.

As shown in FIG. 1C, any of the marking threads 131-133 can receive, e.g., by taking, an available assignment from the assignment queue 120 (step 135). The marking thread that receives an assignment rasterizes the specified object(s) into the specified region of the pixel array 20 (step 137). After completing rasterization according to the assignment, the marking thread returns to take a next assignment, as discussed in detail with reference to FIG. 3B.

The synchronization module 140 is used to avoid interference between the marking threads 131-133. Two marking threads interfere when they attempt to rasterize the image 10 in overlapping regions of the pixel array 20 at the same time. In one implementation, the synchronization module 140 includes registers that store information about which regions of the pixel array are currently assigned to the marking threads for rasterization. By checking the registers before taking an assignment, a marking thread can avoid interference with other marking threads. Furthermore, checking the registers can help marking threads to receive balanced workload. When taking or completing an assignment, the marking threads can update the registers in the synchronization module 140.

In alternative implementations, the synchronization module 140 can be part of the assignment queue 120, or assignments in the assignment queue can include synchronization information. For example, in the assignment queue 120, assignments can be flagged to signal which assignments might cause interference. Optionally, the assignments can include information about the workload required to perform the assignment.

Figure 2:
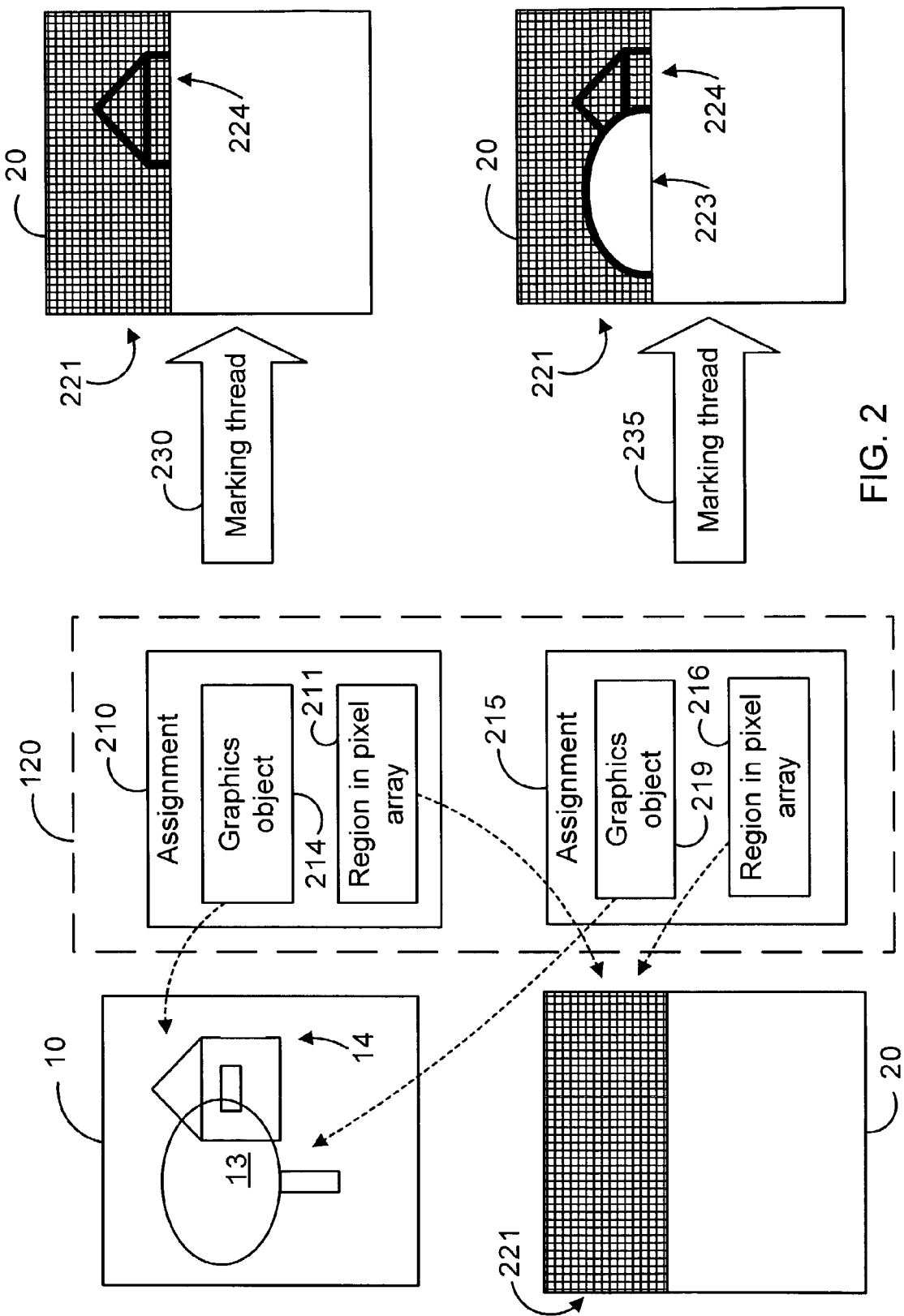
FIG. 2 is a schematic diagram showing an exemplary implementation of assignments according to one aspect of the invention.

FIG. 2 shows a first assignment 210 preceding a second 215 assignment in the assignment queue 120. The first and second assignments include instructions for rasterizing the image 10 into the pixel array 20. The first assignment 210 specifies a first object 214, which is the "house" 14 in the image 10, and a first region 211 in the pixel array 20. The second assignment 215 specifies a second object 219, which is the "tree" 13 in the image, and a second region 216 in the pixel array 20. In the example shown in FIG. 2, the first and second regions share a common set of pixels 221 (i.e., the first and second regions of the pixel array are the same, corresponding to pixels 221). According to the first and second assignments, the first and second objects will be rasterized into the common set of pixels 221. Other assignments in the assignment queue 120 can specify different regions that include pixels outside the common set of pixels 221.

In alternative implementations, the first and second assignments can include further instructions related, e.g., to opacity handling or color dithering during rasterization. Furthermore, assignments in the assignment queue 120 can include synchronization information or instructions for the synchronization module 140. For example, the second assignment 215 can include an instruction that requires completion of the first assignment 210 before starting the second assignment.

A first marking thread 230 takes the first assignment 210 from the assignment queue. The first marking thread, which can be any of the marking threads 131-133, rasterizes a first portion 224 of the first object 214, i.e., the "house" 14. The first portion 224 is a portion of the "house" 14 that lies within the first region 211 of the pixel array. In one implementation, the first assignment 210 specifies the entire "house" 14 as the first object 214, and the first marking thread 230 determines the first portion 224 from a geometrical overlap of the "house" 14 and the first region 211. Alternatively, a preprocessing thread can generate a new graphics object that includes only the first portion 224 of the "house", and specify the new graphics object as the first object 214.

A second marking thread 235 takes the second assignment 215 from the assignment queue. The second marking thread, which can be any of the marking threads 131-133, rasterizes a second portion 223 of the second object 219, i.e., the "tree" 13. The second portion 223 is a portion of the "tree" 14 that lies within the second region 216 of the pixel array. While rasterizing the second portion 223, the second marking thread 235 can overwrite previously assigned pixel values of the pixels within the second region 216. To determine how to overwrite previous pixel values, the second marking thread can use information about opacity in the second assignment 215, the previous pixel value, or the second object.

Because the second region 216 and the first region 211 share the common set of pixels 221, the second marking thread 235 can interfere with the first marking thread 230, if the first and second assignments are rasterized concurrently. To avoid the interference, the second marking thread 235 can check the synchronization module 140 before taking the second assignment. If no other marking thread, including the first marking thread 230, is currently rasterizing into a region that includes pixels from the second region 216, the second marking thread can take the second assignment without interfering with other marking threads.

Figures 3A, 3B:
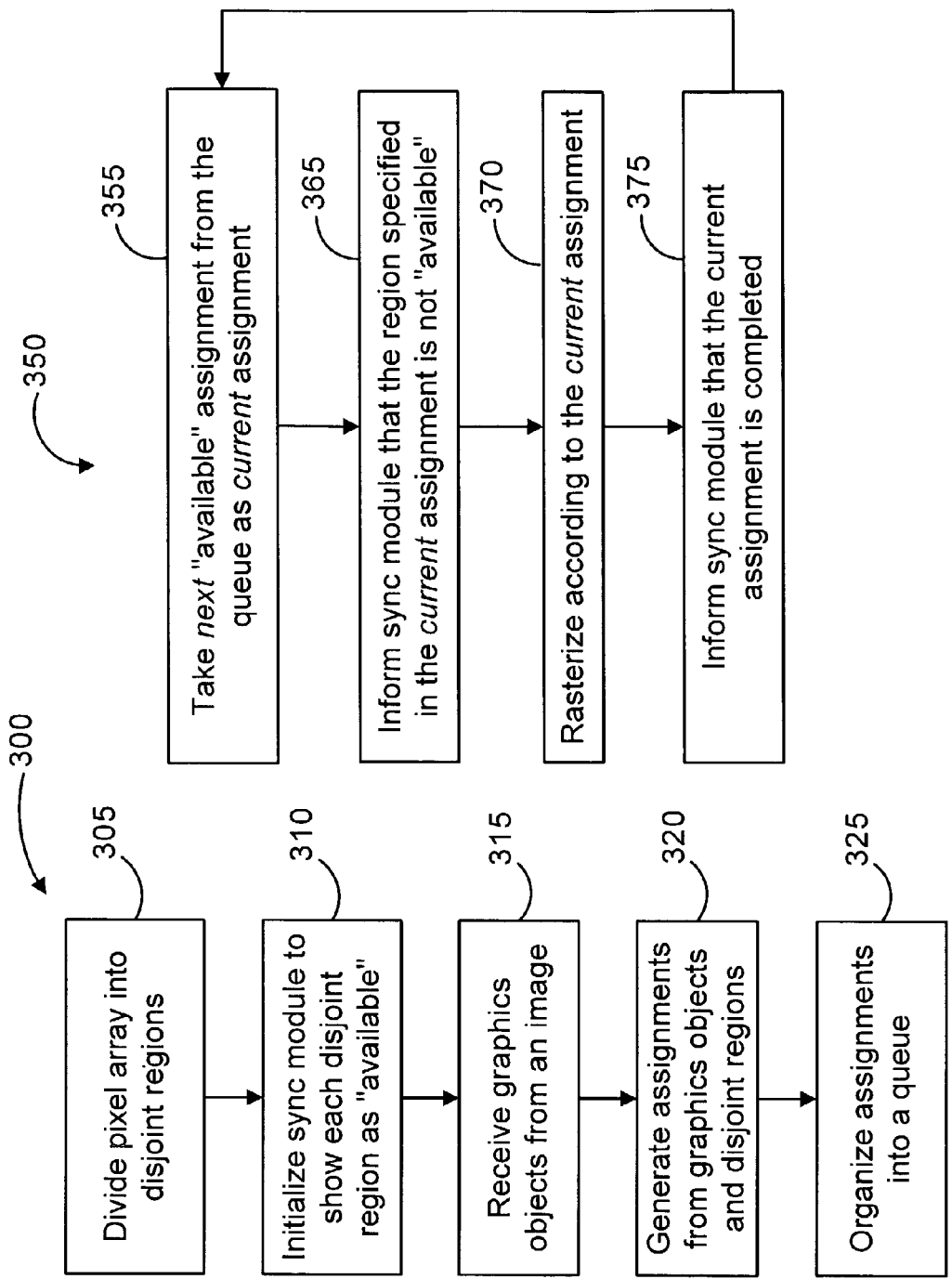
FIGS. 3A and 3B are flowcharts showing processes performed by a preprocessing thread and a marking thread, respectively, to organize assignments in a first implementation.

FIG. 3A shows a preprocessing method 300 for generating and organizing assignments into an assignment queue for rasterizing an image into a pixel array. The first preprocessing method 300 can be performed by a preprocessing thread, such as the preprocessing thread 110 shown in FIG. 1.

The preprocessing thread divides the pixel array into multiple disjoint regions (step 305). Typically the multiple disjoint regions cover the whole pixel array. A disjoint region can be a rectangular region, such as a page, a band, or a tile. Alternatively, the disjoint region can be any other region in the pixel array, and can have curved boundaries, for example, when the pixel array has a circular shape. Typically, the disjoint regions have a uniform size.

The number and/or size of disjoint regions can be chosen to optimize performance and to balance workload of the multiple marking threads. For example, it can be advantageous to have more disjoint regions than marking threads, if, on average, a marking thread requires substantially shorter time to take an assignment from the assignment queue than to complete rasterization according to the assignment. Alternatively, the number of disjoint regions can be substantially the same as the number of marking threads.

If rasterizing the image requires different amounts of work in different uniform regions, the disjoint regions can have different sizes to balance workload. To determine optimal regions, the preprocessing thread can estimate workload in different disjoint regions. To estimate workload, the preprocessing thread can take into account a number, area, color, or complexity of graphics objects in a region (e.g., for a given assignment). For example, black and white objects with sharp boundaries can be rasterized with less work than colored objects with smooth shading.

The preprocessing thread initializes a synchronization module (step 310) that stores synchronization information about each disjoint region. In one implementation, the synchronization module includes registers showing if a disjoint region is or is not "available" for rasterization. A disjoint region is "available" if no marking thread is assigned to rasterize within the disjoint region. In this implementation, to initialize the synchronization module, the preprocessing thread can initialize the registers to show each disjoint region as being "available".

The preprocessing thread receives graphics objects from the image (step 315) and generates assignments (step 320) from the received graphics objects. A generated assignment specifies one or more graphics objects and a region of the pixel array. To balance workload between different marking threads, a single assignment can specify more than one received graphics object, or the specified region can include more than one disjoint region. In one implementation, the preprocessing thread estimates workload of an assignment based on the graphics objects and the region specified in the assignment. Alternatively, the synchronization module can monitor average completion time of assignments, and the preprocessing thread can adjust assignment generation to achieve substantially equal completion times for all assignments.

The preprocessing thread organizes the generated assignments into a sequence in an assignment queue (step 325). In the assignment queue, the assignments can be listed in an order that depends, e.g., on opacity and/or paint order of graphics objects specified in the assignments. Marking threads can take assignments starting from the top or the bottom of the assignment queue. Optionally, the preprocessing thread can include additional synchronization information in the assignments.

FIG. 3B shows a marking method 350 for rasterizing the image according to the assignments in the assignment queue that has been organized by the preprocessing method 300. The marking method 350 can be performed by a marking thread, such as the marking threads 131-133 shown in FIG. 1.

The marking thread takes an "available" assignment from the assignment queue as current assignment (step 355). In one implementation, an assignment is "available" if the region specified in the assignment is "available", i.e., no other marking thread is rasterizing within the specified region. To find an "available" assignment in the assignment queue, the marking thread can rely on information or instructions from the synchronization module. For example, the marking thread can check in the synchronization module whether a region specified in an assignment is "available", or not. Alternatively, the synchronization module can directly point the marking thread to the next "available" assignment in the assignment queue.

If there is no "available" assignment in the assignment queue, the marking thread can stop running, start performing other processes, or wait until an assignment becomes "available". Assignments may become "available", when another marking thread completes an assignment, or when a new "available" assignment is generated by the preprocessing thread.

The marking thread informs the synchronization module that the region specified in the current assignment is no longer available for rasterization (step 365). Based on this information, the synchronization module can then show all disjoint regions that overlap with the specified region as "not available". While a disjoint region is "not available", no other marking thread can rasterize within the disjoint region.

The marking thread rasterizes according to the current assignment (step 370), and informs the synchronization module when the current assignment is completed (step 375). Based on this information, the synchronization module can show the region specified in the current assignment (and potentially other disjoint regions that overlap with it) as being "available" again.

The marking thread returns to take a next "available" assignment (step 355). The next assignment specifies a next region that may be a different or the same as the region specified in the previous assignment. In an alternative implementation, the marking thread stops after informing (step 375) the synchronization module.

Figure 4:
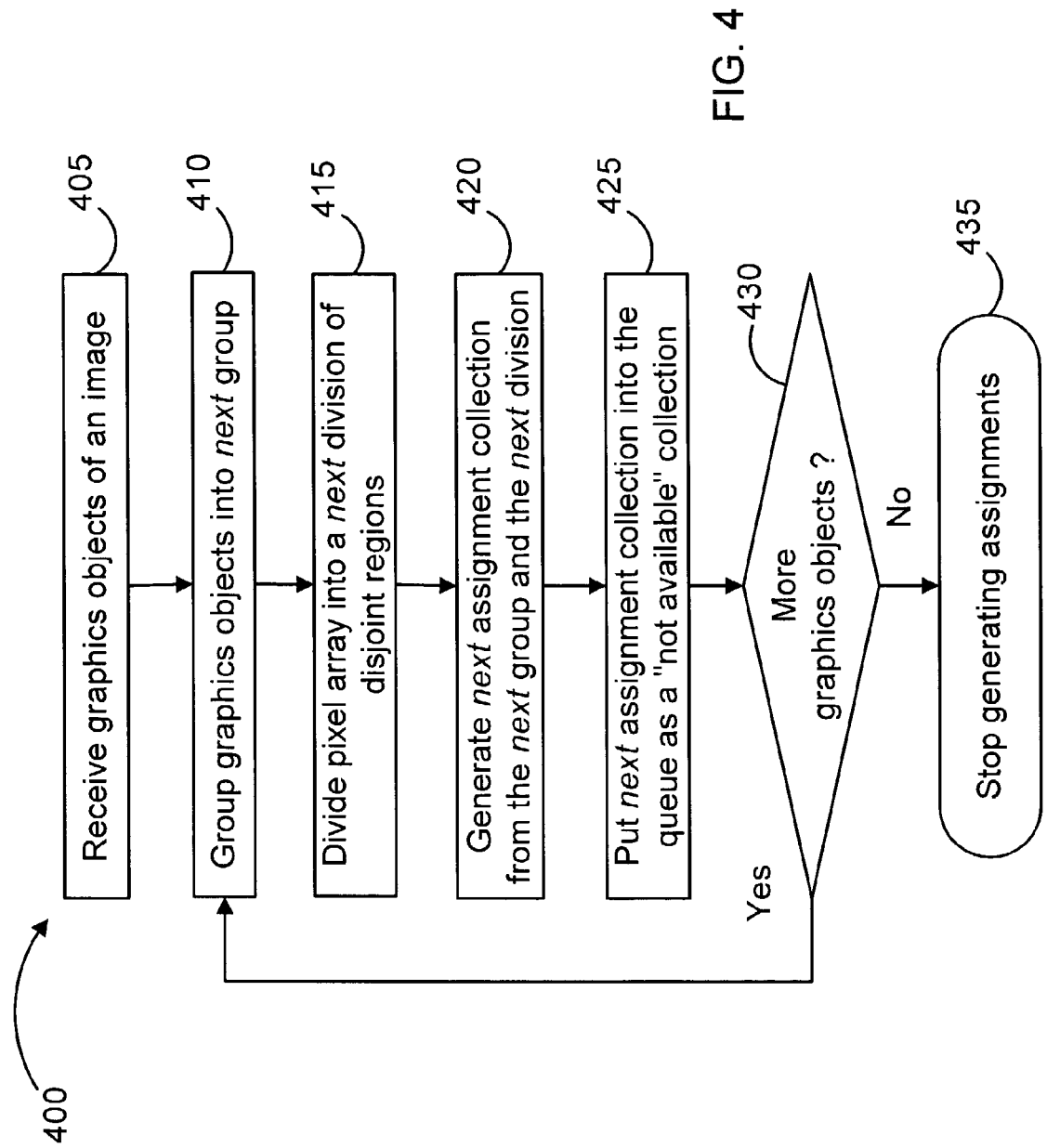
FIG. 4 is a flowchart showing a process performed by a preprocessing thread to organize assignments in a second implementation.

FIG. 4 shows an alternative preprocessing method 400 for generating and organizing assignments into an assignment queue by a preprocessing thread. The preprocessing thread receives graphics objects of an image (step 405), and groups some of the received graphics objects into a next group (step 410). Based on the graphics objects in the next group, the preprocessing thread divides a pixel array into a next division of disjoint regions (step 415).

The next division can be chosen to balance workload between marking threads that rasterize the image. In one implementation, the next division is based on an estimate of workloads in the next group. Alternatively, the next division can be based on monitoring completion times of assignments in previous groups. Optionally, the next division can be the same as the previous division.

The preprocessing thread generates a next assignment collection from the graphics objects in the next group (step 420). In the next assignment collection, assignments specify regions selected from the next division of disjoint regions. The next assignment collection is put into an assignment queue, and a corresponding synchronization module is initialized to show the next assignment collection as "not available" (step 425). If an assignment collection is "not available", all assignments in the assignment collection are "not available", i.e., no marking thread can take an assignment from the "not available" assignment collection.

If there are graphics objects in the image that have not yet been grouped ("Yes" branch of decision 430), the preprocessing thread returns to generate a new next group of graphics objects. Otherwise ("No" branch of decision 430), the preprocessing thread stops generating assignment collections.

To rasterize according to the assignment collections generated in the preprocessing method 400, a marking thread can perform the marking method 350 (see FIG. 3B). In one implementation, to avoid interference between marking threads, the synchronization module ensures that there is only one active assignment collection in the assignment queue. The synchronization module activates a "not available" assignment collection by making assignments in the assignment collection "available". Before activation, the synchronization module waits until no marking thread is rasterizing into the pixel array, and activates the "not available" assignment collection by making all assignments in the assignment collection "available".

Alternatively, the synchronization module can activate a "not available" assignment collection partially. In this implementation, the synchronization module selects assignments from a next assignment collection and makes only the selected assignments "available". For example, the synchronization module can select assignments that specify regions that do not include pixels that are used for rasterizing by currently running marking threads. By making such assignments "available", the idle time of processor threads can be minimized without causing interference.

Figure 5:
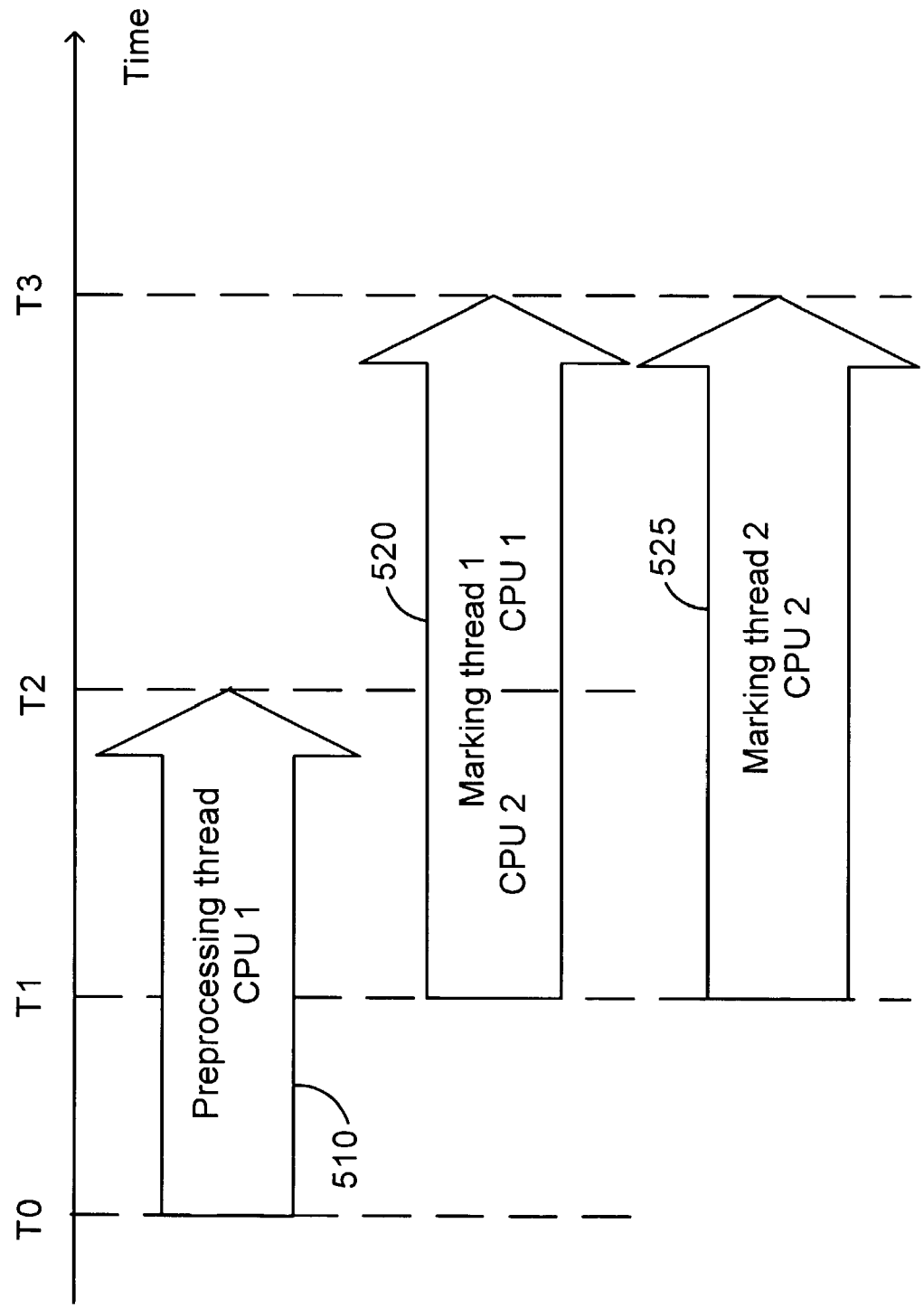
FIG. 5 is a schematic diagram showing an exemplary distribution of processor threads among processors.

As shown in FIG. 5, preprocessing and marking threads can be performed by multiple CPUs to minimize idle time, i.e., time when a processor thread or a processor is waiting for input or instructions. When rasterizing with multiple processor threads, idle time depends on the number of marking threads compared to the number of CPUs that are performing the threads. In the example shown in FIG. 5, the number of marking threads is equal to the number of CPUs, i.e., two.

A preprocessing thread starts to run at time T0 on a first CPU. The preprocessing thread generates and organizes assignments into an assignment queue as described above. At time T1, a first marking thread and a second marking thread start taking the assignments from the assignment queue. While the first CPU performs the preprocessing thread, both the first and the second marking threads are running on a second CPU. At time T2, the preprocessing thread is completed and the first CPU takes over the first marking thread from the second CPU, which continues to perform only the second marking thread. By balancing workload in assignments taken by the first and second marking threads, both the first and the second marking threads can complete rasterization at approximately the same time T3.

Typically, each of the multiple CPUs has substantially similar performance. However, if different CPUs have different performance, idle times can be minimized by performing a larger portion of the marking threads with CPUs that have higher performance. Alternatively, workload in assignments can be adjusted to achieve a substantially equal completion time for all marking threads.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A method for rasterizing an image into a pixel array, the method comprising:
   generating a plurality of assignments, each assignment specifying one or more graphics objects and a region of the pixel array into which the specified graphics objects are to be rasterized, wherein the plurality of assignments includes two or more assignments that specify overlapping regions of the pixel array;
   establishing a plurality of processes for rasterizing objects into the pixel array, each process being operable to receive an assignment and to rasterize the objects of the assignment into the region of the assignment;
   selecting assignments for concurrent execution by the processes, the assignments being selected so that no two concurrently executing assignments have overlapping regions, a given assignment being selected for execution only if no executing assignment specifies a region that overlaps the region specified by the given assignment; and
   concurrently executing the selected assignments by separate processes to rasterize the respective objects of the assignments into their respective regions.

2. The method of claim 1, wherein:
   the plurality of assignments includes a first assignment specifying a first region of the pixel array and a second assignment specifying a second region of the pixel array, the first region including one or more pixels included in the second region.

3. The method of claim 2, wherein:
   the first assignment and the second assignment specify a common region of the pixel array.

4. The method of claim 1, wherein selecting assignments includes selecting a first assignment and a second assignment for concurrent execution by a first process and a second process, respectively, the method further comprising:
   after the first process has completed execution of the first assignment, selecting a third assignment for execution by the first process.

5. The method of claim 4, wherein:
the third assignment and the first assignment specify a common region of the pixel array.

6. The method of claim 5, wherein:
before selection of the third assignment for execution by the first process, the third assignment is selectable for execution by either of the first process or the second process.

7. The method of claim 5, wherein:
after the selection of the first assignment for execution, the third assignment is not selectable for execution until the first process has completed execution of the first assignment.

8. The method of claim 4, wherein:
the third assignment and the second assignment specify a common region of the pixel array, the third assignment being selectable by the first process only after the second process has completed rasterization according to the second assignment.

9. The method of claim 1, wherein:
generating a plurality of assignments includes generating an assignment queue; and
the assignments are ordered in the assignment queue based at least in part on the determination whether concurrent execution of the assignments would require rasterization into overlapping regions.

10. The method of claim 1, further comprising:
after selecting an assignment for execution by a process, recording assignment information identifying the region specified in the selected assignment as being unavailable for assignment to other processes while the selected assignment is being executed.

11. The method of claim 1, wherein generating a plurality of assignments includes:
receiving a plurality of graphics objects associated with an image to be rasterized into a pixel array;
dividing the pixel array into a plurality of regions; and
associating, as an assignment of the plurality of assignments, one or more of the plurality of graphics objects with one or more of the plurality of regions into which the associated graphics objects are to be rasterized.

12. The method of claim 11, wherein dividing the pixel array includes selecting region boundaries based at least in part on estimates of amounts of work required to execute assignments in the regions.

13. The method of claim 11, wherein:
associating one or more of the plurality of graphics objects with one or more of the plurality of regions includes associating the graphics objects with the regions to form assignments based at least in part on a comparison of an amount of work required to execute each of a plurality of the assignments.

14. The method of claim 13, wherein the processes are performed by multiple processors and the comparison of the amount of work required to execute each of a plurality of the assignments includes considering differing performance capabilities of the processors.

15. The method of claim 11, wherein:
receiving a plurality of graphics objects includes receiving a first group of graphics objects associated with the image;
dividing the pixel array into a plurality of regions includes dividing the pixel array into a first plurality of disjoint regions; and
associating the graphics objects with the regions includes associating one or more graphics objects in the first group of graphics objects with one or more regions from the first plurality of disjoint regions to form assignments in a first collection of assignments.

16. The method of claim 15, wherein:
receiving a plurality of graphics objects further includes receiving a second group of graphics objects associated with the image;
dividing the pixel array into a plurality of regions further includes dividing the pixel array into a second plurality of disjoint regions; and
associating the graphics objects with the regions further includes associating one or more graphics objects in the second group of graphics objects with one or more regions from the second plurality of disjoint regions to form assignments in a second collection of assignments.

17. The method of claim 1, wherein the assignments specify opacity handling during rasterization.

18. The method of claim 1, wherein the assignments specify color dithering during rasterization.

19. The method of claim 1, wherein each assignment further specifies synchronization information.

20. A computer program product, tangibly embodied in a machine-readable storage device, for rasterizing an image into a pixel array, the computer program product including instructions operable to cause data processing apparatus to:
generate a plurality of assignments, each assignment specifying one or more graphics objects and a region of the pixel array into which the specified graphics objects are to be rasterized, wherein the plurality of assignments includes two or more assignments that specify overlapping regions of the pixel array;
establish a plurality of processes for rasterizing objects into the pixel array, each process being operable to receive an assignment and to rasterize the objects of the assignment into the region of the assignment;
select assignments for concurrent execution by the processes, the assignments being selected so that no two concurrently executing assignments have overlapping regions, a given assignment being selected for execution only if no executing assignment specifies a region that overlaps the region specified by the given assignment; and
concurrently execute the selected assignments by separate processes to rasterize the respective objects of the assignments into their respective regions.

21. The computer program product of claim 20, wherein:
the plurality of assignments includes a first assignment specifying a first region of the pixel array and a second assignment specifying a second region of the pixel array, the first region of the pixel array including one or more pixels included in the second pixel array.

22. The computer program product of claim 21, wherein:
the first assignment and the second assignment specify a common region of the pixel array.

23. The computer program product of claim 20, wherein the instructions operable to cause data processing apparatus to select assignments include instructions operable to cause data processing apparatus to select a first assignment and a second assignment for concurrent execution by a first process and a second process, respectively, the computer program product is further comprising instructions operable to cause data processing apparatus to:
select, after the first process has completed execution of the first assignment, a third assignment of the plurality of assignments for execution by the first process.

24. The computer program product of claim 23, wherein:
the third assignment and the second assignment specify one or more common regions of the pixel array, the third assignment being selectable by the first process only after the second process has completed rasterization according to the second assignment.

25. The computer program product of claim 23, wherein: the third assignment and the first assignment specify one or more common regions of the pixel array.

26. The computer program product of claim 25, wherein: before selection of the third assignment for execution by the first process, the third assignment is selectable for execution by either of the first process or the second process.

27. The computer program product of claim 25, wherein: after the selection of the first assignment for execution, the third assignment is not selectable for execution until the first process has completed execution of the first assignment.

28. The computer program product of claim 20, wherein:
the instructions operable to cause data processing apparatus to generate a plurality of assignments include instructions operable to cause data processing apparatus to generate an assignment queue; and
the assignments are ordered in the assignment queue based at least in part on the determination whether concurrent execution of the assignments would require rasterization into overlapping regions.

29. The computer program product of claim 20, further comprising instructions operable to cause data processing apparatus to:
record, after selecting an assignment for execution by a process, assignment information identifying the one or more regions specified in the selected assignment as being unavailable for assignment to other processes while the selected assignment is being executed.

30. The computer program product of claim 20, wherein the instructions operable to cause data processing apparatus to generate a plurality of assignments include instructions operable to cause data processing apparatus to:
receive a plurality of graphics objects associated with an image to be rasterized into a pixel array;
divide the pixel array into a plurality of regions; and
associate, as an assignment of the plurality of assignments, one or more of the plurality of graphics objects with one or more of the plurality of regions into which the associated graphics objects are to be rasterized.

31. The computer program product method of claim 30, wherein:
the instructions operable to cause data processing apparatus to receive a plurality of graphics objects include instructions operable to cause data processing apparatus to receive a first group of graphics objects associated with the image;
the instructions operable to cause data processing apparatus to divide the pixel array into a plurality of regions include instructions operable to cause data processing apparatus to divide the pixel array into a first plurality of disjoint regions; and
the instructions operable to cause data processing apparatus to associate the graphics objects with the regions include instructions operable to cause data processing apparatus to associate one or more graphics objects in the first group of graphics objects with one or more regions from the first plurality of disjoint regions to form assignments in a first collection of assignments.

32. The computer program product of claim 31, wherein:
the instructions operable to data processing apparatus to receive a plurality of graphics objects include instructions operable to cause data processing apparatus to receive a second group of graphics objects associated with the image;
the instructions operable to cause data processing apparatus to divide the pixel array into a plurality of regions include the instructions operable to cause data processing apparatus to divide the pixel array into a second plurality of disjoint regions; and
the instructions operable to cause data processing apparatus to associate the graphics objects with the regions further include the instructions operable to cause data processing apparatus to associate one or more graphics objects in the second group of graphics objects with one or more regions from the second plurality of disjoint regions to form assignments in a second collection of assignments.

33. The computer program product of claim 30, wherein:
the instructions operable to cause data processing apparatus to associate one or more of the plurality of graphics objects with one or more of the plurality of regions include instructions operable to cause data processing apparatus to associate the graphics objects with the regions to form assignments based at least in part on a comparison of an amount of work required to execute each of a plurality of the assignments.

34. The computer program product of claim 33, wherein the processes are performed by multiple processors and the instructions operable to cause data processing apparatus to compare the amount of work required to execute each of a plurality of the assignments include instructions operable to cause data processing apparatus to consider differing performance capabilities of the processors.

35. The computer program product of claim 30, wherein the instructions operable to cause data processing apparatus to divide the pixel array into regions include instructions operable to cause data processing apparatus to select region boundaries based at least in part on estimates of amounts of work required to execute assignments in the regions.

36. The computer program product of claim 20, wherein the instructions operable to cause data processing apparatus to generate assignments further include instructions operable to cause data processing apparatus to specify opacity handling during rasterization.

37. The computer program product of claim 20, wherein the instructions operable to cause data processing apparatus to generate assignments further include instructions operable to cause data processing apparatus to specify color dithering during rasterization.

38. The computer program product of claim 20, wherein the instructions operable to cause data processing apparatus to generate assignments further include instructions operable to cause data processing apparatus to specify synchronization information.

39. A system for rasterizing an image into a pixel array, the system comprising:
means for generating a plurality of assignments, each assignment specifying one or more graphics objects and a region of the pixel array into which the specified graphics objects are to be rasterized, wherein the plurality of assignments includes two or more assignments that specify overlapping regions of the pixel array;

means for establishing a plurality of processes for rasterizing objects into the pixel array, each process being operable to receive an assignment and to rasterize the objects of the assignment into the region of the assignment;

means for selecting assignments for concurrent execution by the processes, the assignments being selected so that no two concurrently executing assignments have overlapping regions, a given assignment being selected for execution only if no executing assignment specifies a region that overlaps the region specified by the given assignment; and means for concurrently executing the selected assignments by separate processes to rasterize the respective objects of the assignments into their respective regions.

40. The system of claim 39, wherein the means for generating a plurality of assignments includes a preprocessor process, executing on data processing apparatus, the preprocessor process being operable to:

receive a plurality of graphics objects associated with an image to be rasterized into a pixel array;

divide the pixel array into a plurality of regions; and associate, as an assignment of the plurality of assignments, one or more of the plurality of graphics objects with one or more of the plurality of regions into which the associated graphics objects are to be rasterized.

41. The system of claim 40, wherein:
the means for establishing includes the preprocessor process.

42. The system of claim 40, wherein the means for associating an assignment of the plurality of assignments includes a means for associating one or more of the plurality of graphics objects with the regions to form assignments based at least in part on a comparison of an amount of work required to execute each of a plurality of assignments.

43. The system of claim 42, further comprising multiple processors, wherein the means for comparing an amount of work includes a means for considering different performance capabilities of the processors.

44. The system of claim 40, wherein the means for dividing the pixel array includes a means for selecting region boundaries based at least in part on estimates of amounts of work required to execute assignments in the regions.

45. The system of claim 39, wherein:
the means for selecting includes a synchronization module operable to store assignment information identifying assignments that can or cannot be concurrently executed.

46. The system of claim 39, wherein:
the means for selecting includes an assignment queue.

47. The system of claim 39, wherein:
the means for concurrently executing the selected assignments includes a plurality of marking processes, the marking processes being operable to receive assignments of the plurality of assignments and rasterize graphics objects into regions of the pixel array according to the selected assignments.

48. The system of claim 39, wherein the means for generating a plurality of assignments includes a means for specifying opacity handling during rasterization.

49. The system of claim 39, wherein the means for generating a plurality of assignments includes a means for specifying color dithering during rasterization.

50. The system of claim 39, wherein the means for generating a plurality of assignments includes a means for specifying synchronization information.

51. A system comprising:
a user interface device; and
one or more computers operable to interact with the user interface device and to perform operations comprising:

generating a plurality of assignments, each assignment specifying one or more graphics objects and a region of a pixel array into which the specified graphics objects are to be rasterized, wherein the plurality of assignments includes two or more assignments that specify overlapping regions of the pixel array;

establishing a plurality of processes for rasterizing objects into the pixel array, each process being operable to receive an assignment and to rasterize the objects of the assignment into the region of the assignment;

selecting assignments for concurrent execution by the processes, the assignments being selected so that no two concurrently executing assignments have overlapping regions, a given assignment being selected for execution only if no executing assignment specifies a region that overlaps the region specified by the given assignment; and concurrently executing the selected assignments by separate processes to rasterize the respective objects of the assignments into their respective regions.

52. The system of claim 51, wherein the one or more computers comprise multiple computers distributed over a network.

* * * * *

UNITED STATES PATENT AND TRADEMARK OFFICE
CERTIFICATE OF CORRECTION

| | | |
|---|---|---|
| PATENT NO. | : 7,365,743 B1 | Page 1 of 1 |
| APPLICATION NO. | : 10/267419 | |
| DATED | : April 29, 2008 | |
| INVENTOR(S) | : Paul Chen and James G. Sandman, Jr. | |

It is certified that error appears in the above-identified patent and that said Letters Patent is hereby corrected as shown below:

Claim 31:
    column 13, line 49:
        delete "computer program product method",
        and replace with --computer program product--

Signed and Sealed this

Seventeenth Day of February, 2009

JOHN DOLL
*Acting Director of the United States Patent and Trademark Office*